United States Patent
Nanbu

(10) Patent No.: US 6,676,157 B2
(45) Date of Patent: Jan. 13, 2004

(54) STORED-GAS INFLATOR

(75) Inventor: Yuichi Nanbu, Shiga-ken (JP)

(73) Assignee: Takata Corporation, Tokyo (JP)

( * ) Notice: Subject to any disclaimer, the term of this patent is extended or adjusted under 35 U.S.C. 154(b) by 2 days.

(21) Appl. No.: 10/078,501

(22) Filed: Feb. 21, 2002

(65) Prior Publication Data

US 2002/0130501 A1 Sep. 19, 2002

(30) Foreign Application Priority Data

Mar. 14, 2001 (JP) ......................................... 2001-072459

(51) Int. Cl.[7] .................................................. B60R 21/26
(52) U.S. Cl. ......................................... 280/736; 280/737
(58) Field of Search .................................. 280/736, 737, 280/738, 740, 741, 742; 137/68.19, 68.23

(56) References Cited

U.S. PATENT DOCUMENTS

| 3,948,540 | A | * | 4/1976 | Meacham | 280/735 |
|---|---|---|---|---|---|
| 5,582,426 | A | * | 12/1996 | O'Loughlin et al. | 280/741 |
| 5,664,802 | A | * | 9/1997 | Harris et al. | 280/736 |
| 6,068,292 | A | * | 5/2000 | Renz | 280/737 |
| 6,170,867 | B1 | * | 1/2001 | Rink et al. | 280/736 |
| 6,234,523 | B1 | * | 5/2001 | Tokoro et al. | 280/737 |

* cited by examiner

Primary Examiner—Paul N. Dickson
Assistant Examiner—Faye M. Fleming
(74) Attorney, Agent, or Firm—Kanesaka & Takeuchi

(57) ABSTRACT

A stored-gas inflator includes a pressure-resistant container having a high-pressure-gas chamber and a gas outlet for ejecting gas from the high-pressure-gas chamber; a burst shim attached to the gas outlet for sealing thereof; a duct disposed inside the high-pressure-gas chamber having an end facing the burst shim; and an initiator attached to the duct for generating gas pressure so that the gas pressure is guided through the duct to push the burst shim. The stored-gas inflator can easily eject gas with significantly lower bursting pressure to burst the burst shim, and a lower-output initiator can be used.

3 Claims, 5 Drawing Sheets

STORED-GAS INFLATOR

BACKGROUND OF THE INVENTION AND RELATED ART STATEMENT

The present invention relates to a stored-gas inflator for ejecting high-pressure gas filled in a pressure-resistant container through a gas outlet. In particular, the present invention relates to a stored-gas inflator including a burst shim that closes a gas outlet and an initiator that generates gas pressure to apply a pressure to the burst shim, in which the bursting pressure created by the initiator bursts the burst shim, thereby opening the gas outlet.

Stored-gas inflators mounted in automobiles are known as gas supply sources for inflating airbags to protect passengers in emergencies by ejecting high-pressure gas filled in pressure-resistant containers through gas outlets. FIG. 5 is a sectional view of such a conventional stored-gas inflator.

A stored-gas inflator 100 shown in FIG. 5 includes a pressure-resistant container 102 having a high-pressure gas charged therein. The pressure-resistant container 102 is provided with gas outlets 104 for ejecting the high-pressure gas filled in the pressure-resistant container 102 to the outside. In an ordinary state, the gas outlets 104 are hermetically sealed with a thin-plate burst shim 106 attached to an inside wall of the pressure-resistant container 102. The burst shim 106 bursts when a higher pressure (bursting pressure) than a predetermined value is applied thereto from outside, thereby causing the outlets 104 to open.

The pressure-resistant container 102 is provided with an initiator (a triggering device) 108 in the vicinity of the gas outlets 104 for applying the bursting pressure to the burst shim 106. The initiator 108 includes a base part 108a fixed to the pressure-resistant container 102 at an outer surface of the pressure-resistant container 102 and a triggering part 108b protruding from the end of the base part 108a. The triggering part 108b is triggered by a triggering signal sent from a controller (not shown).

The pressure-resistant container 102 is provided with a bursting pressure inlet 110 in the vicinity of the gas outlets 104, and the triggering part 108b is inserted in the bursting pressure inlet 110. The burst shim 106 also hermetically seals the bursting pressure inlet 110.

When a triggering signal from the controller (not shown) is sent to the initiator 108, the triggering part 108b bursts in the bursting pressure inlet 110 and applies the bursting pressure to the burst shim 106 exposed in the bursting pressure inlet 110, thereby bursting the burst shim 106, causing the gas outlets 104 to open and eject the filled gas through the outlets 104.

In the stored-gas inflator 100 described above, the burst shim 106 sealing the outlets 104 constantly receives a pressure of the charged gas from inside of the pressure-resistant container 102. On the other hand, the initiator 108 applies the bursting pressure to the burst shim 106 from the outside of the pressure-resistant container 102 where a pressure (atmospheric pressure) is significantly low as compared with the pressure of the charged gas.

Therefore, in order to burst the burst shim 106 against the gas pressure in the pressure-resistant container 102, it is necessary to apply at least twice higher pressure than the gas pressure in the pressure-resistant container 102 to the burst shim 106, so that a very high output initiator (high gas-ejection force upon triggered) is required.

Accordingly, an object of the present invention is to provide a stored-gas inflator that can eject gas with a low-output initiator.

Further objects and advantages of the invention will be apparent from the following description of the invention.

SUMMARY OF THE INVENTION

According to the present invention, a stored-gas inflator comprises a pressure-resistant container including a high-pressure-gas chamber and a gas outlet for ejecting gas from the high-pressure-gas chamber; a burst shim for sealing the gas outlet; and an initiator for generating a bursting pressure for bursting the burst shim. The stored-gas inflator also includes a duct for guiding the ejected gas from the initiator such that the burst pressure of the initiator is applied to the burst shim from the inside of the high-pressure-gas chamber.

In the stored-gas inflator of the present invention, the pressure generated by the initiator is applied to the burst shim from the inside of the gas-charged chamber via the duct. The burst shim covers and closes the gas outlet such that the burst shim is hermetically attached to the periphery of the gas outlet and constantly receives the charged-gas pressure from the inside of the gas-charged chamber. When the initiator is triggered, the ejected-gas pressure is guided through the duct and applied to the burst shim from the inside of the gas-charged chamber in cooperation with the charged-gas pressure (superimposing each other on the burst shim).

In the stored-gas inflator according to the present invention, the pressure applied to the burst shim from the inside of the gas-charged chamber is increased by the ejected-gas pressure from the initiator that is applied to the burst shim from the inside of the gas-charged chamber, thereby bursting the burst shim. Therefore, the initiator used in the stored-gas inflator according to the present invention is required to have an output for increasing the pressure applied to the burst shim from the inside of the gas-charged chamber only by a difference of the charged-gas pressure of the gas-charged chamber and the bursting pressure. Therefore, a relatively low-output initiator can easily burst the burst shim and open the gas outlet.

In the stored-gas inflator according to the present invention, it is preferable that an end of the duct faces the burst shim and the end of the duct is sealed with a sealing plate. The sealing plate and the burst shim may be connected to each other.

In the configuration described above, the burst shim closes the gas outlet such that the burst shim is attached to the periphery of the outlet and is connected to or supported by the duct at the end thereof via the sealing plate of the duct. Therefore, at the burst shim, the charged-gas pressure applied thereto from the inside of the gas-charged chamber is divided between a portion connected to the periphery of the outlet and a portion connected to the end of the duct.

The ejected-gas pressure from the initiator is applied to the sealing plate at the end of the duct. When the ejected-gas pressure breaks the sealing plate at the end of the duct, the connection between the burst shim and the periphery of the outlet can not support the charged-gas pressure in the gas-charged chamber and the ejected-gas pressure from the initiator, thereby breaking the burst shim and opening the outlet.

DETAILED DESCRIPTION OF PREFERRED EMBODIMENTS

Figure 1:
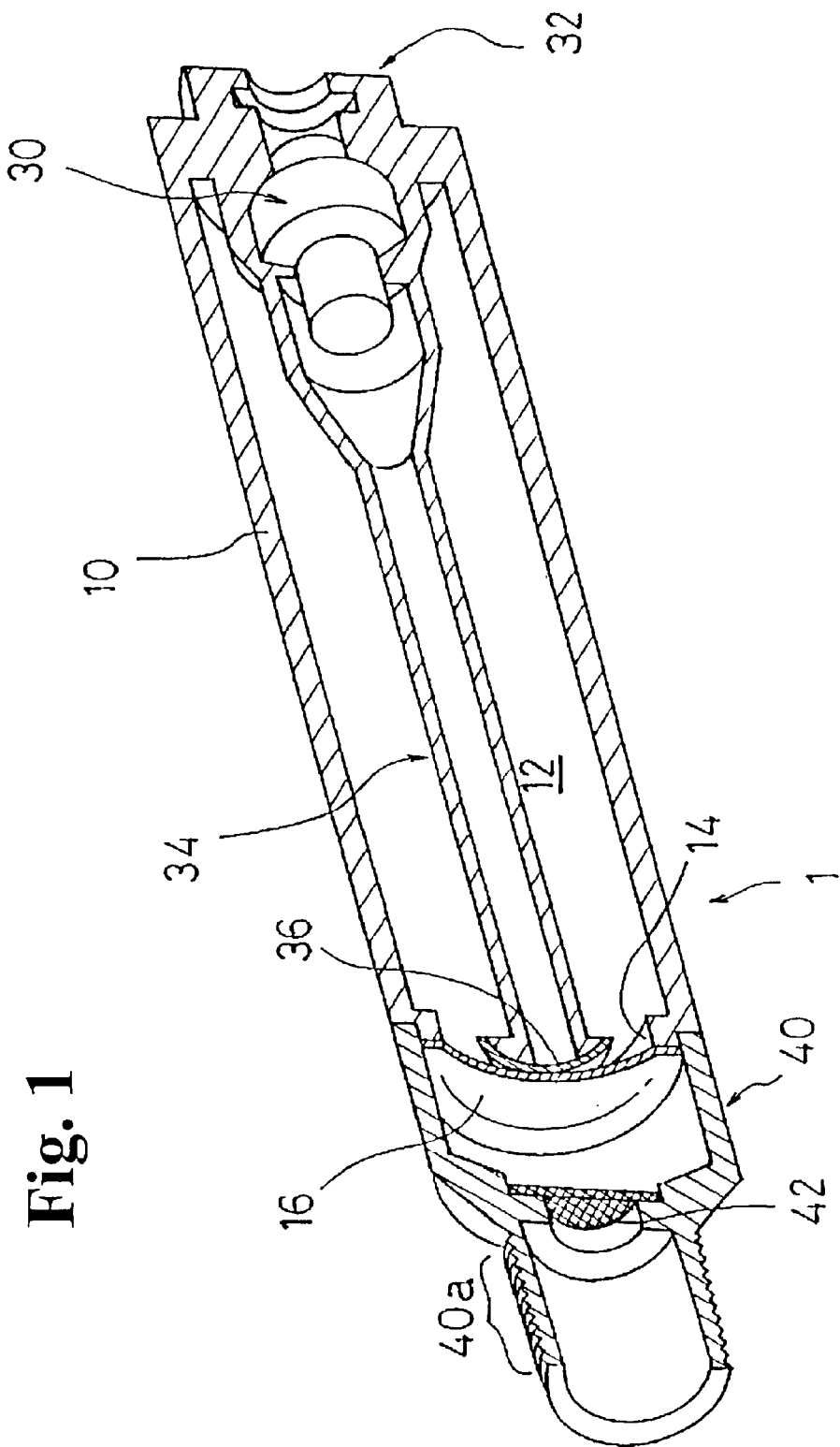
FIG. 1 is a perspective sectional view of a stored-gas inflator according to an embodiment of the present invention.
Figure 2:
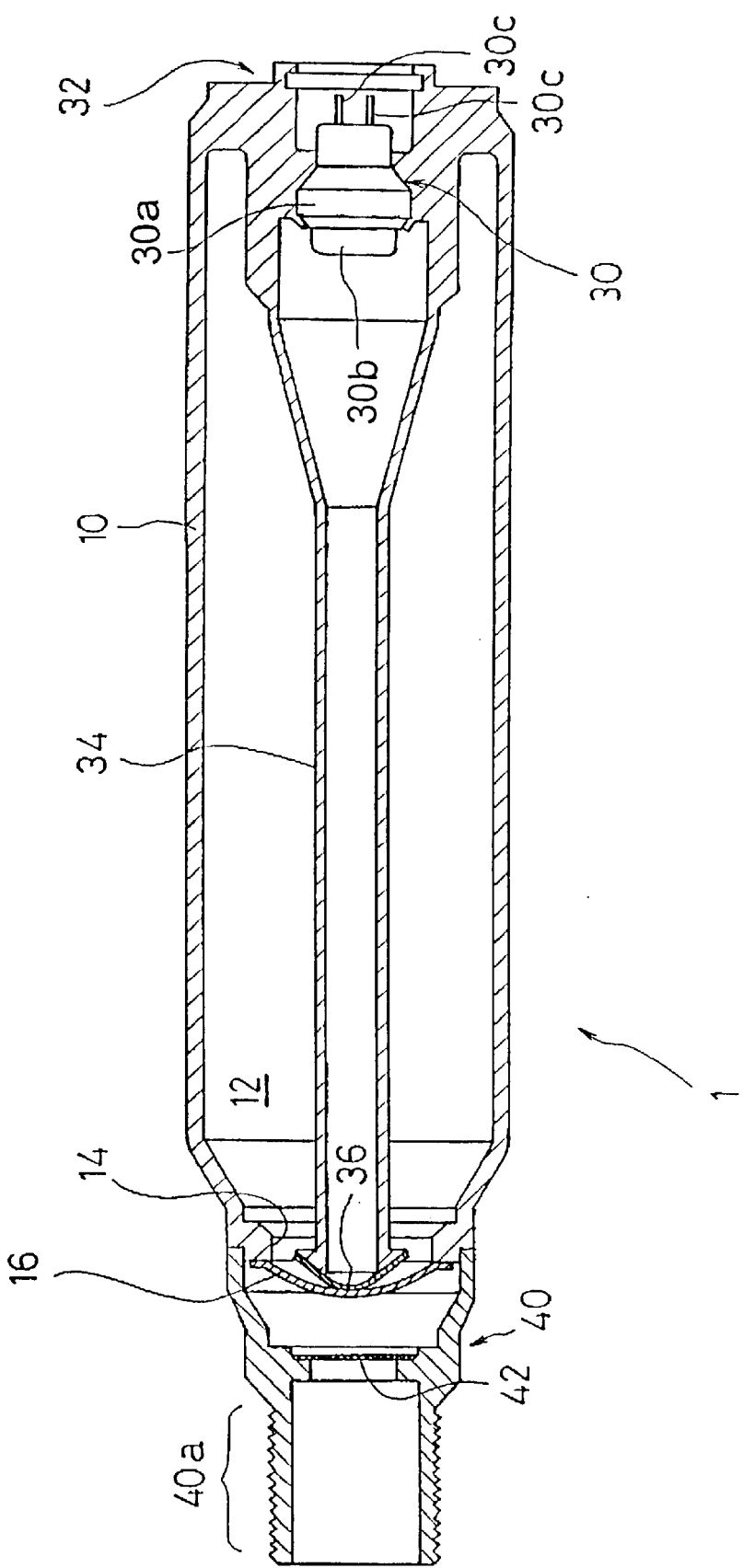
FIG. 2 is a side sectional view of the stored-gas inflator shown in FIG. 1.
Figure 3:
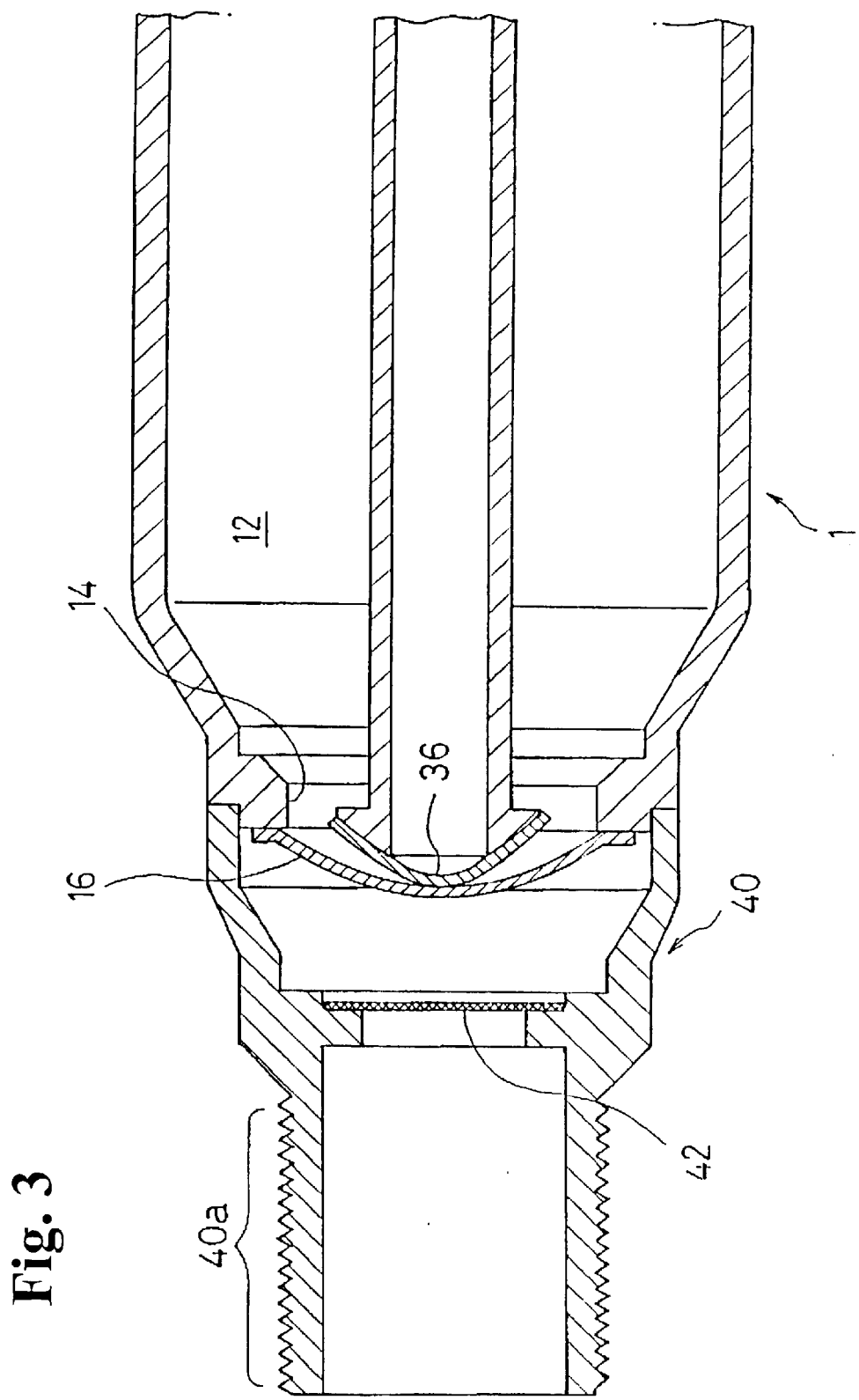
FIG. 3 is an enlarged view of a critical portion of the stored-gas inflator shown in FIG. 2.

Hereunder, embodiments of the present invention will be described with reference to the accompanied drawings. FIG. 1 is a perspective sectional view of a stored-gas inflator according to an embodiment of the present invention. FIG. 2 is a sectional side view of the stored-gas inflator shown in FIG. 1. FIG. 3 is an enlarged view of a critical portion of the stored-gas inflator shown in FIG. 2.

A stored-gas inflator 1 includes a cylindrical pressure-resistant container 10. The pressure-resistant container 10 has therein a gas-charged chamber 12. A high-pressure gas is charged in the gas-charged chamber 12 at a predetermined inner pressure (Pm). The pressure-resistant container 10 is provided with a gas outlet 14 at a longitudinal end (fore-end) thereof.

The gas outlet 14 is sealed with a burst shim 16. The burst shim 16 covers the outlet 14 and is hermetically attached to the periphery of the outlet 14 at the periphery of the burst shim 16, thereby closing the outlet 14. The burst shim 16 bursts, thereby opening the outlet 14, when a higher pressure than a predetermined value (P1) is applied to the burst shim 16 from the inside of the gas-charged chamber 12. The pressure value P1 is smaller than the charged-gas pressure Pm. The burst shim 16 of the stored-gas inflator 1 receives the charged-gas pressure in cooperation with a sealing plate 36, which is described below.

The pressure-resistant container 10 includes an initiator-mounting part 32 at the other longitudinal end (rear end) of the pressure-resistant container 10. An initiator 30 for generating an ejected-gas pressure for applying a pressure to the burst shim 16 is mounted at the mounting part 32. Also, a duct 34 is provided at the mounting part 32 for guiding the ejected-gas pressure of the initiator 30 to the burst shim 16 such that the ejected-gas pressure is applied to the burst shim 16 from the inside of the gas-charged chamber 12.

The duct 34 is a tubular member extending in the gas-charged chamber 12 connected to the initiator-mounting part 32 at an end (base end) of the duct 34, and faces the burst shim 16 from the inside of the gas-charged chamber 12 at the other end (fore-end) of the duct 34. The sealing plate 36 at the fore-end of the duct 34 seals the duct 34.

The sealing plate 36 is connected to the fore-end of the duct 34 so as to seal the end of the duct 34. When the sealing plate 36 receives a higher pressure than a predetermined pressure value P2 from the inside of the duct 34, the sealing plate 36 is released from the fore-end of the duct 34, thereby opening the duct 34. As shown in FIGS. 2 and 3, the sealing plate 36 is connected to the burst shim 16 at the inside of the gas-charged chamber 12. The burst shim 16 can support the charged-gas pressure applied thereto from the inside of the gas-charged chamber 12 at a connected portion between the periphery of the burst shim 16 and the periphery of the outlet 14 as well as between the sealing plate 36 and the fore-end of the duct 34. The pressure value P2 is smaller than the charged-gas pressure Pm in the gas-charged chamber, and the sum of the pressure value P2 and the pressure value P1 (P1+P2) is set to be larger than the charged-gas pressure Pm.

Hereinafter, the pressure value P1 is referred to as "bursting pressure P1" to burst the burst shim 16, and the pressure value P2 is referred to as "bursting pressure P2" to burst the sealing plate 36.

The initiator 30 includes a base part 30a with a large diameter and a trigger part 30b projecting from a fore-end of the base part 30a. The initiator 30 also includes a connector 30c at a rear end of the base part 30a and is connected to an initiator controller (not shown) via the connector 30c. The trigger part 30b is triggered by a triggering signal input from the initiator controller.

The initiator-mounting part 32 is provided with an inlet that communicates with the duct 34 at the base end thereof to insert the trigger part 30b of the initiator 30 into the duct 34. The initiator 30 is mounted to the initiator-mounting part 32 such that the trigger part 30b is inserted into the duct 34 through the inlet, and the base part 30a is hermetically engaged with the initiator-mounting part 32 and is firmly fixed thereto.

The trigger part 30b inserted into the base end of the duct 34 through the inlet is exposed in the duct 34. When a trigger signal from the controller is input to the initiator 30, the trigger part 30b explodes and ejects gas into the duct 34.

According to the present embodiment, the stored-gas inflator 1 is provided with a tubular male connecting part 40 that communicates with the gas outlet 14. The male connecting part 40 is provided with a male screw 40a formed at an outer peripheral surface of the fore-end of the male connecting part 40. The stored-gas inflator 1 is screwed at the male connecting part 40 thereof into a female connecting part (not shown) of a gas-supply pipe for a passenger-protection airbag mounted in a fast-moving body such as an automobile, whereby the stored-gas inflator 1 is hermetically connected to the pipe and is capable of supplying gas thereto.

The male connecting part 40 is provided with a filter 42 for preventing fragments of the burst shim 16 and the sealing plate 36 created by the ejected-gas pressure of the initiator 30 from entering into the gas-supply pipe (not shown) together with the high-pressure gas, when the stored-gas inflator 1 ejects gas. The filter 42 is provided in the tubular male connecting part 40, prevents fragments of the burst shim 16 and the like from passing through the pipe, and only allows the ejected gas flowing through the pipe.

The operation of the stored-gas inflator 1 described above will be explained next.

The stored-gas inflator 1 is connected to the gas-supply pipe for the passenger-protection airbag mounted in a fast-moving body (not shown) via the male connecting part 40. A high-pressure gas is charged into the gas-charged chamber 12 at an inner pressure Pm. In this case, the burst shim 16 firmly seals the outlet 14 by being hermetically attached to the periphery of the gas outlet 14 at the periphery of the burst shim 16 and being connected to the fore-end of the duct 34 that faces the burst shim 16 via sealing plate 36 from the inside of the gas-charged chamber 12, whereby the burst shim 16 supports the charged-gas pressure Pm from the inside of the gas-charged chamber 12.

In an emergency such as a collision of an automobile, a trigger signal from an initiator controller (not shown) is input to the initiator 30, and the trigger part 30b inserted into the duct 34 at the rear end thereof explodes, thereby ejecting the gas. Through the duct 34, the ejected-gas produced by the explosion pushes the sealing plate 36 that seals the duct 34 at the fore-end thereof. When the ejected-gas pressure reaches the bursting pressure P2, the sealing plate 36 is broken and the connection between the burst shim 16 and the duct 34 via the sealing plate 36 is released.

When the connection between the burst shim 16 and the duct 34 is released, the connected part between the periphery of the burst shim 16 and the periphery of the outlet 14 can not support the gas pressure in the gas-charged chamber 12 and the ejected-gas pressure of the initiator 30 exceeds the bursting pressure P1. Therefore, the burst shim 16 bursts immediately after the sealing plate 36 is broken.

With this process, the gas outlet 14 rapidly opens, and a large volume of the high-pressure gas is instantly ejected into the outlet 14 and is supplied to an airbag through the gas-supply pipe.

In the stored-gas inflator 1, the burst shim 16 supports the charged-gas pressure Pm of the gas-charged chamber 12 at the connecting portion between the periphery of the burst shim 16 and the periphery of the outlet 14 and the connecting portion between the sealing plate 36 and the fore-end of the duct 34, thereby closing the outlet 14. Therefore, the strength of each connection, that is, the bursting pressures P1 and P2 to burst the burst shim 16 and the sealing plate 36, respectively, can be significantly lowered. When the bursting pressure P1 to burst the burst shim 16 is set to be smaller than the charged-gas pressure Pm and the connection strength between the sealing plate 36 and the duct 34, corresponding to the bursting pressure P2, compensates for the difference, the burst shim 16 can be broken by the charged-gas pressure Pm only through bursting the sealing plate 36 by the ejected-gas pressure of the initiator 30. Therefore, the output of the initiator 30 can be small.

Figure 4:
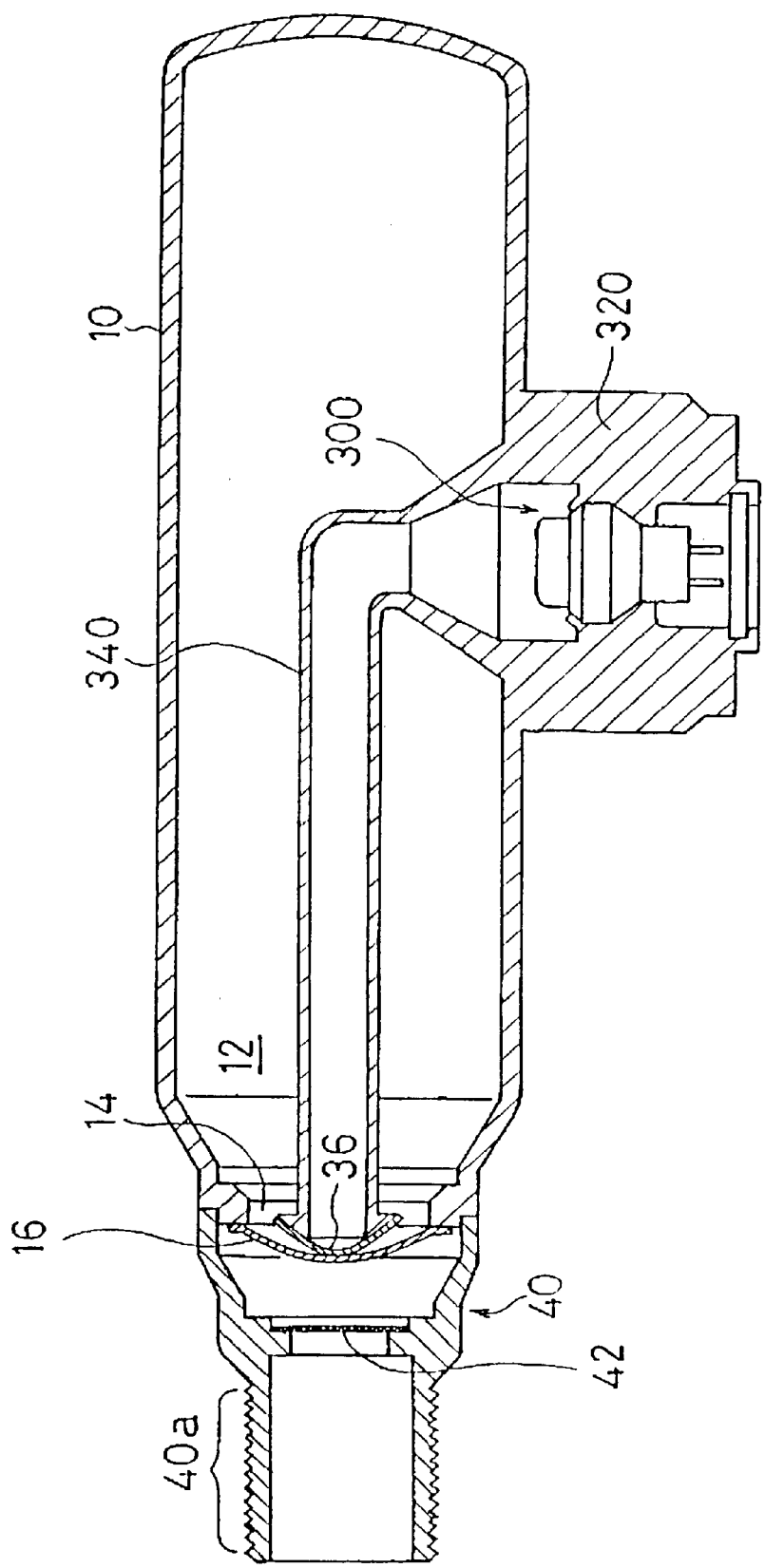
FIG. 4 is a side sectional view of a stored-gas inflator according to another embodiment of the present invention.
Figure 5:
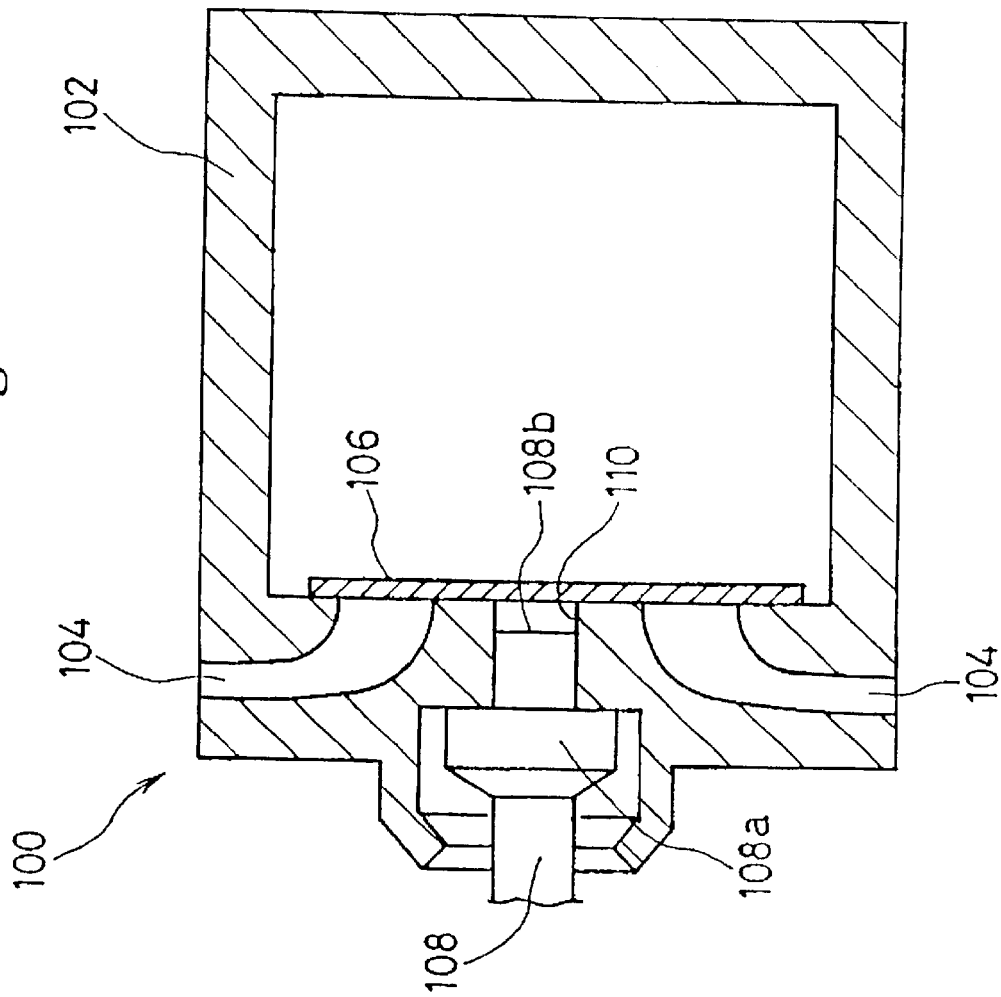
FIG. 5 is a sectional view of a conventional stored-gas inflator.

Although, according to the above-described embodiment, the initiator 30 is disposed at the rear end of the pressure-resistant container 10, a position of the initiator of the stored-gas inflator according to the present invention is not limited to the above embodiment. As shown in FIG. 4, for example, an initiator 300 may be disposed at an initiator-mounting part 320 formed at a longitudinally intermediate part of a pressure-resistant container 10. An ejected-gas of the initiator 300 may be applied to the burst shim 16 through a substantially L-shaped duct 340 extending from the longitudinally intermediate part to the fore-end of the pressure-resistant container 10 and facing the burst shim 16. The stored-gas inflator according to the present invention may be also arranged in other ways.

As described above, the stored-gas inflator according to the present invention is arranged such that the ejected-gas of the initiator is applied to the burst shim from the inside of the gas-charged chamber in which the high-pressure gas is charged, whereby the stored-gas inflator can eject gas by a low-output initiator that can reliably burst the burst shim.

According to the present invention, the stored-gas inflator can easily eject gas with significantly lower bursting pressure to burst the burst shim, and the lower-output initiator can be used.

While the invention has been explained with reference to the specific embodiments of the invention, the explanation is illustrative and the invention is limited only by the appended claims.

What is claimed is:

1. A stored-gas inflator comprising:
   a container including a pressure chamber and a gas outlet for ejecting a gas from the pressure chamber;
   a burst shim attached to the gas outlet for sealing the same;
   a duct disposed inside the pressure chamber and having one end facing the burst shim and a sealing plate formed at the one end for sealing the same, said sealing plate and said burst shim being connected to each other; and
   an initiator attached to the duct for generating gas pressure so that when the initiator is actuated, the gas pressure thereof is guided through the duct to the sealing plate and burst shim to break the sealing plate and burst shim.

2. A stored-gas inflator according to claim 1, wherein said initiator is located in the pressure chamber at a side opposite to the burst shim to directly guide the gas from the initiator to the burst shim.

3. A stored-gas inflator according to claim 1, further comprising an initiator-mounting part retaining the initiator and formed at a lateral side of the container close to the burst shim, said duct being bent in the pressure chamber.

* * * * *